No. 12,698. REISSUED OCT. 1, 1907.

F. McM. SAWYER.

BUILDING BLOCK.

APPLICATION FILED AUG. 1, 1907.

Witnesses

Percy B. Hills

J. M. Copenhaver.

Inventor

Frank McMurray Sawyer

By Edwin L. Jewell his Attorney

UNITED STATES PATENT OFFICE.

FRANK McMURRAY SAWYER, OF CHARLOTTE, NORTH CAROLINA, ASSIGNOR TO AMERICAN ROOFING TILE COMPANY, A CORPORATION OF NORTH CAROLINA.

BUILDING-BLOCK.

REISSUED

No. 12,698. Specification of Reissued Letters Patent. Reissued Oct. 1, 1907.

Original No. 812,369, dated February 13, 1906, Serial No. 249,256. Application for reissue filed August 1, 1907. Serial No. 386,675.

*To all whom it may concern:*

Be it known that I, FRANK McMURRAY SAWYER, a citizen of the United States, residing at Charlotte, in the county of Mecklenburg and State of North Carolina, have invented certain new and useful Improvements in Building-Blocks; and I do declare the following to be a full, clear, and exact description of the invention, such as will enable others skilled in the art to which it appertains to make and use the same.

This invention relates to building-blocks; and one of the principal objects of the same is to provide a molded artificial-stone building block or brick which will present a smooth unbroken outer and inner surface to a wall and which will provide vertical ventilating openings or air-passages from the bottom to the top of the wall.

Another object is to provide a building block or brick which can be manufactured at slight cost and which will break joints when laid and in which the corners of the wall will be braced and tied, owing to the contour of the bricks and the manner in which the same are laid in forming the wall.

These and other objects are attained by means of the construction illustrated in the accompanying drawings, in which—

Figure 1:
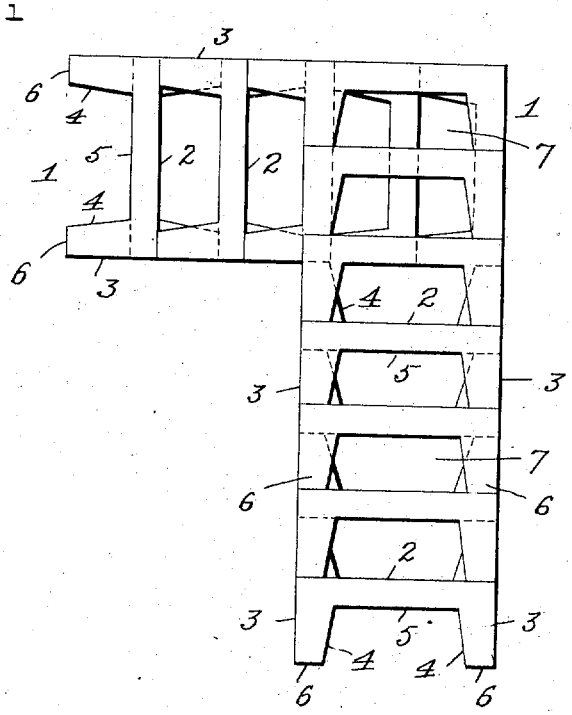
Figure 2:
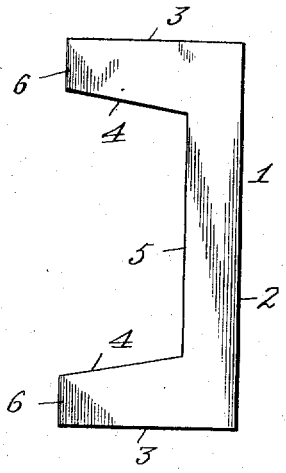
Figure 3:
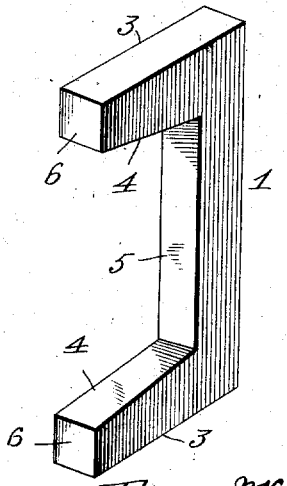

Figure 1 is a plan view of a wall during the course of construction with bricks made in accordance with my invention. Fig. 2 is a plan view of one of my bricks or blocks, and Fig. 3 is a perspective view of the same.

Referring to the drawings for a more particular description of my invention, the numeral 1 designates a brick or block which may be molded of cement and sand or other plastic material, said brick consisting of the plain front surface 2, extending entirely across the brick, and ends 3, which are also unbroken, and the oblique walls 4 upon the inside of the brick, the wall or surface 5 connecting the oblique surfaces, and thus forming the substantially rectangular feet 6. Owing to the contour and dimensions of the brick a wall can be built in which the bricks are reversed in each alternate layer, as shown in Fig. 1 of the drawings, and all the joints will thus be broken and the bricks be firmly tied, providing vertical air-spaces 7 in the walls, and the air-spaces in the corners divided into four equal divisions braced by the web 5 of the brick. A brick made in accordance with my invention is comparatively light in weight, requires less material to manufacture the same than is required in bricks of ordinary construction, while the advantages of a ventilating-wall are attained by the use of the brick and at the same time the corners of the walls are braced and tied in a strong and efficient manner.

Various changes in the form, proportion, and the minor details of construction may be resorted to without departing from the principle or sacrificing any of the advantages of this invention.

Having thus described my invention, what I claim as new, and desire to secure by Letters Patent, is:—

1. The herein-described building-wall made up of bricks or blocks having three unbroken surfaces 2, 3, 3, the surfaces 3, 3, forming the inner and outer facing of the wall, and a recessed side forming feet 6, the inner walls 4 of which are oblique and providing the inner wall or web 5, said blocks being placed in reverse order in each alternate layer to break joint and to provide vertical ventilating spaces 7 between the bricks and to form cross bracing-webs in the corners of the walls, essentially as described.

2. The herein described building wall made up of bricks or blocks, each having three unbroken outer surfaces and having its remaining surface recessed, said blocks being reversed in each alternate layer and placed so that their oppositely disposed unbroken surfaces form the inner and outer facings of the wall.

3. The herein described building wall, made up of bricks or blocks, each having three unbroken outer surfaces and having its remaining surface recessed, said blocks being reversed in each alternate layer and placed so that their oppositely disposed surfaces form the inner and outer facings of the wall and so that the portions connecting said oppositely disposed surfaces register vertically with each other.

4. The herein described building wall, made up of bricks or blocks, each having three unbroken outer surfaces and having its remaining surface recessed, said blocks being reversed in each alternate layer and placed so that their oppositely disposed surfaces form the inner and outer facings of the wall and so that the portions connecting said oppositely disposed surfaces register vertically with each other, thus spacing the joints in said outer and inner facings in each alternate layer the thickness of said connecting portions.

FRANK McMURRAY SAWYER.

Witnesses:
JNO. R. ROSS,
W. P. RIESON.